United States Patent
Bocks et al.

(10) Patent No.: US 10,421,567 B2
(45) Date of Patent: Sep. 24, 2019

(54) SEALING BAR FOR A VACUUM DRAWER AND VACUUM DRAWER

(71) Applicant: Michatek k.s., Michalovce (SK)

(72) Inventors: Stefan Bocks, Frasdorf (DE); Florian Harlander, Niederndorf (AT); Peter Kopfensteiner, Ebbs (AT)

(73) Assignee: Michatek k.s., Michalovce (SK)

( * ) Notice: Subject to any disclaimer, the term of this patent is extended or adjusted under 35 U.S.C. 154(b) by 382 days.

(21) Appl. No.: 15/233,055

(22) Filed: Aug. 10, 2016

(65) Prior Publication Data
US 2017/0043892 A1 Feb. 16, 2017

(30) Foreign Application Priority Data

Aug. 11, 2015 (DE) .................. 10 2015 010 432

(51) Int. Cl.
| | | |
|---|---|---|
| B65B 51/22 | (2006.01) | |
| B65B 31/02 | (2006.01) | |
| B65B 65/06 | (2006.01) | |
| B29C 65/22 | (2006.01) | |
| B29C 65/00 | (2006.01) | |

(Continued)

(52) U.S. Cl.
CPC ............ *B65B 51/22* (2013.01); *B29C 65/224* (2013.01); *B29C 65/229* (2013.01); *B29C 66/0044* (2013.01); *B29C 66/00145* (2013.01); *B29C 66/1122* (2013.01); *B29C 66/43121* (2013.01); *B29C 66/8122* (2013.01); *B29C 66/8167* (2013.01); *B29C 66/8324* (2013.01); *B29C 66/849* (2013.01); *B65B 31/024* (2013.01); *B65B 51/146* (2013.01); *B65B 51/148* (2013.01); *B65B 65/06* (2013.01); *B29L 2031/7128* (2013.01)

(58) Field of Classification Search
CPC ....... B65B 51/22; B65B 31/024; B65B 65/06; B29C 65/224; B29C 65/229; B29C 66/0044; B29C 66/8122; B29C 65/22; B29C 65/222; B29C 66/43121; B29C 66/81–8122; B29C 81/816; B29C 81/8145; B29C 81/8167; B29C 81/8165
See application file for complete search history.

(56) References Cited

U.S. PATENT DOCUMENTS

2,574,095 A * 11/1951 Langer ................ B29C 66/1122
156/583.2
2,682,294 A * 6/1954 Langer .................... B29C 66/80
156/282

(Continued)

FOREIGN PATENT DOCUMENTS

DE 25 52 342 A1 8/1976
DE 10 2013 014 656 A1 3/2015

(Continued)

OTHER PUBLICATIONS

Canadian Office Action dated Aug. 16, 2017.

*Primary Examiner* — Robert F Long
*Assistant Examiner* — Eduardo R Ferrero
(74) *Attorney, Agent, or Firm* — Dilworth & Barrese, LLP

(57) ABSTRACT

The invention relates to a sealing bar for a vacuum drawer for the vacuuming of food, having a base support comprising at least one heating wire as well as having a frame part with an integrated non-stick coating, wherein the frame part is releasably fastenable to the base support.

11 Claims, 7 Drawing Sheets

(51) Int. Cl.
*B65B 51/14* (2006.01)
*B29L 31/00* (2006.01)

(56) References Cited

U.S. PATENT DOCUMENTS

| | | | | |
|---|---|---|---|---|
| 3,472,721 A * | 10/1969 | Abramson | B29C 65/1445 | 100/211 |
| 3,551,259 A * | 12/1970 | Schwarzkopf | B29C 65/7437 | 156/515 |
| 3,553,059 A * | 1/1971 | Stohlquist | B29C 65/229 | 156/251 |
| 3,671,357 A * | 6/1972 | Trouilhet | B29C 65/229 | 156/359 |
| 3,677,845 A * | 7/1972 | Roberts | B29C 63/40 | 156/215 |
| 3,707,428 A * | 12/1972 | Roberts | B29C 63/06 | 156/583.3 |
| 3,708,377 A * | 1/1973 | Finke | B29C 65/228 | 156/553 |
| 3,767,508 A * | 10/1973 | Hawkins | B29C 65/229 | 156/389 |
| 3,830,681 A * | 8/1974 | Wilson | B29C 65/18 | 156/583.2 |
| 3,847,711 A * | 11/1974 | Howard | B29C 66/8322 | 156/515 |
| 3,874,976 A * | 4/1975 | MacFarland, Jr. | B29C 65/7451 | 156/251 |
| 3,912,575 A * | 10/1975 | Zelnick | B29C 65/223 | 156/515 |
| 3,958,391 A | 5/1976 | Kujubu | | |
| 4,016,021 A * | 4/1977 | La Fleur | B29C 65/18 | 100/211 |
| 4,082,941 A * | 4/1978 | Sukow | B29C 65/02 | 156/515 |
| 4,093,500 A * | 6/1978 | Browne | B29C 66/80 | 156/510 |
| 4,244,771 A * | 1/1981 | Pierce | B29B 13/023 | 156/499 |
| 4,545,177 A * | 10/1985 | Day | B65B 25/06 | 53/434 |
| 4,999,081 A * | 3/1991 | Buchanan | B29C 65/18 | 156/251 |
| 5,094,657 A * | 3/1992 | Dworak | B65B 9/087 | 156/323 |
| 5,239,808 A | 8/1993 | Wells et al. | | |
| 5,638,664 A * | 6/1997 | Levsen | B29C 66/0044 | 53/372.6 |
| 5,826,503 A * | 10/1998 | Hutchinson | B29C 65/18 | 100/320 |
| 6,119,590 A * | 9/2000 | Hutchinson | B29C 66/0042 | 100/320 |
| 6,335,515 B1 * | 1/2002 | Chou | B29C 66/225 | 219/227 |
| 6,450,088 B1 * | 9/2002 | Hutchinson | B29C 66/0042 | 100/320 |
| 6,789,371 B1 | 9/2004 | Buysman et al. | | |
| 6,998,577 B2 * | 2/2006 | Chou | B29C 66/849 | 156/229 |
| 8,528,346 B2 * | 9/2013 | Allard | A23L 3/3418 | 62/62 |
| 2001/0000608 A1 * | 5/2001 | Chang | B29C 66/0044 | 219/243 |
| 2001/0032710 A1 * | 10/2001 | Sadler | B29C 65/228 | 156/583.6 |
| 2003/0159405 A1 * | 8/2003 | Knowlton | B29C 65/743 | 53/434 |
| 2003/0213216 A1 * | 11/2003 | Harte | B29C 65/228 | 53/510 |
| 2006/0045941 A1 * | 3/2006 | Ogiue | A23B 4/16 | 426/106 |
| 2010/0116441 A1 * | 5/2010 | Tsai | B29C 65/229 | 156/583.9 |
| 2013/0284214 A1 * | 10/2013 | Haring | B65B 51/146 | 134/37 |
| 2016/0324196 A1 * | 11/2016 | Bocks | B65B 31/024 | |

FOREIGN PATENT DOCUMENTS

| | | |
|---|---|---|
| EP | 1149768 A1 | 10/2001 |
| EP | 2862807 A1 | 4/2015 |
| GB | 778777 A | 7/1957 |

* cited by examiner

SEALING BAR FOR A VACUUM DRAWER AND VACUUM DRAWER

BACKGROUND OF THE INVENTION

The invention relates to a sealing bar for a vacuum drawer for vacuuming food as well as to a vacuum drawer which comprises a vacuum chamber having such a sealing bar.

Vacuuming units comprise a vacuum chamber into which a suitable container, for example in the form of a sealable bag, is placed. An elongate sealing bar extends within the chamber and is installed transversely to the vacuum chamber. The sealing bar is vertically adjustable in the vertical direction. A container filled with food is placed into the vacuum chamber, the latter subsequently being closed in an airtight manner via a cover to generate a chamber vacuum by means of a vacuum pump. Since the sealing bar is first positioned in an open position, the air can also be sucked out of the container. The sealing bar is subsequently vertically adjusted and the bag is clamped between the sealing bar and the counterpart. The required welding energy is supplied to the integrated welding wire or to the welding wire of the sealing bar such that the bag, which frequently contains plastic, is sealed in an airtight manner due to the heat development.

A heat-conductive non-stick coating is typically applied to the upper side of the sealing bar onto which the bag to be welded is placed and said non-stick coating transfers the heat development of the welding wire disposed thereunder to the bag lying directly on the coating. The coating is typically a suitable film which is adhesively bonded to the surface of the single-part sealing bar construction. The constant heat development during the welding process sooner or later produces visual wear phenomena of the non-stick tape, which is characterized by disturbing discoloration. The non-stick function and heat-conductive function of the tape can thereby also be impaired in addition to the visual deficiencies. The non-stick coating should be renewed from time to time for this purpose. An exchange of single films is practically impossible due to the adhesive bond so that the total sealing bar is replaced for reasons of simplicity. The high repair costs caused by the complete replacement are, however, undesirable.

SUMMARY OF THE INVENTION

It is consequently the object of the present invention to provide a new construction of the sealing bar which allows a more favorable replacement of the non-stick coating.

This object is achieved by a sealing bar for a vacuum drawer for vacuuming food in accordance with the features herein. Advantageous embodiments of the sealing bar are the subject of the description herein.

In accordance with the invention, the innovative sealing bar comprises a base support which comprises the required welding wire as well as a frame part having an integrated non-stick coating, with the frame part and the base support being releasable connectable to or connected to one another. The sealing bar is accordingly configured in two parts so that it does not have to completely replaced, but only the frame part, including the coating, has to be exchanged to renew the nonstick coating. To replace the frame part, the complete sealing bar is removed from the vacuum drawer and the frame part is released from the base support for the replacement. The base support is ideally releasably latched to the frame part. The replacement is thus not only simpler, but also likewise less expensive. The coating can preferably be implemented by a non-stick tape which can also be replaced separately with a releasable fastening to the frame part. The repair costs thereby fall further.

The non-stock coating is also thermally conductive in addition to the non-stick property and it in particular consists of thermally conductive material. The non-stick tape is a Teflon tape in accordance with a preferred embodiment. The non-stick tape preferably extends in parallel with the welding wire, i.e. the welding wire is covered by the non-stick tape to prevent a direct contact between the welding wire and the bag to be sealed. The non-stick tape easily transfers the heating development of the welding wire to the bag to be sealed, but due to the material composition of the non-stick tape, a sticking of the bag to the sealing bar is prevented.

The frame part for receiving the non-stick tape can preferably have an opening at its upper side which is continuous in the longitudinal direction and which is covered at least partly, ideally almost completely, by the non-stick tape. The upper side of the frame part corresponds to the surface of the sealing bar onto which the bag is placed for sealing.

The non-stick tape is preferably wider than the opening of the frame part. In this case, the longitudinal edges of the non-stick tape are bent or folded downwardly and project into the opening of the frame part into the interior of the sealing bar. The non-stick tape can be fixed in the interior of the sealing bar by means of the folded longitudinal edges.

A dirt-collecting edge, which results in a visual deficiency on a corresponding contamination, may be produced between the opening edge and the non-stick tape under certain circumstances. At least one opening edge of the frame part, at least a longitudinal edge of the opening, is provided with a sealing lip to avoid the dirt-collecting edge. A "flowing" transition is provided between the frame part and the non-stick tape by the sealing lip, whereby the step between the frame part and the non-stick tape is considerably reduced. A reduced generation of dirt is produced at the transition.

It is particularly preferred if the fold of the longitudinal edges of the non-stick tape forms a bent, step-like section which lies on the shape of the sealing lip with an exact fit or which extends at least partly around the sealing lip.

The non-stick tape is preferably fixed to the frame part and/or to the base support. The connection can be releasable, for example by means of a clamping between the base support and the frame part, or it can be fixed by adhesive bonding. The adhesive bonding with the frame part is applied at least at points. A combination of a clamping connection and of an adhesively bonding connection is also conceivable.

In addition to the sealing bar in accordance with the invention, the present invention additionally relates to a vacuum drawer, in particular for installation into a piece of furniture, having a vacuum chamber and at least one sealing bar in accordance with the present invention or in accordance with an advantageous embodiment of the invention, the sealing bar supported in the vacuum chamber. The same advantages and properties thus result for the vacuum drawer such as have already been explained in more detail with reference to the sealing bar in accordance with the invention. A repeat description is consequently dispensed with.

BRIEF DESCRIPTION OF THE DRAWINGS

Further advantages and particulars of the invention will be explained in more detail with reference to the embodiment shown in the Figures. There are shown:

FIG. 5b: a detailed view of the representation in accordance with FIG. 5a, and

DESCRIPTION OF THE PREFERRED EMBODIMENTS

Figure 1A:
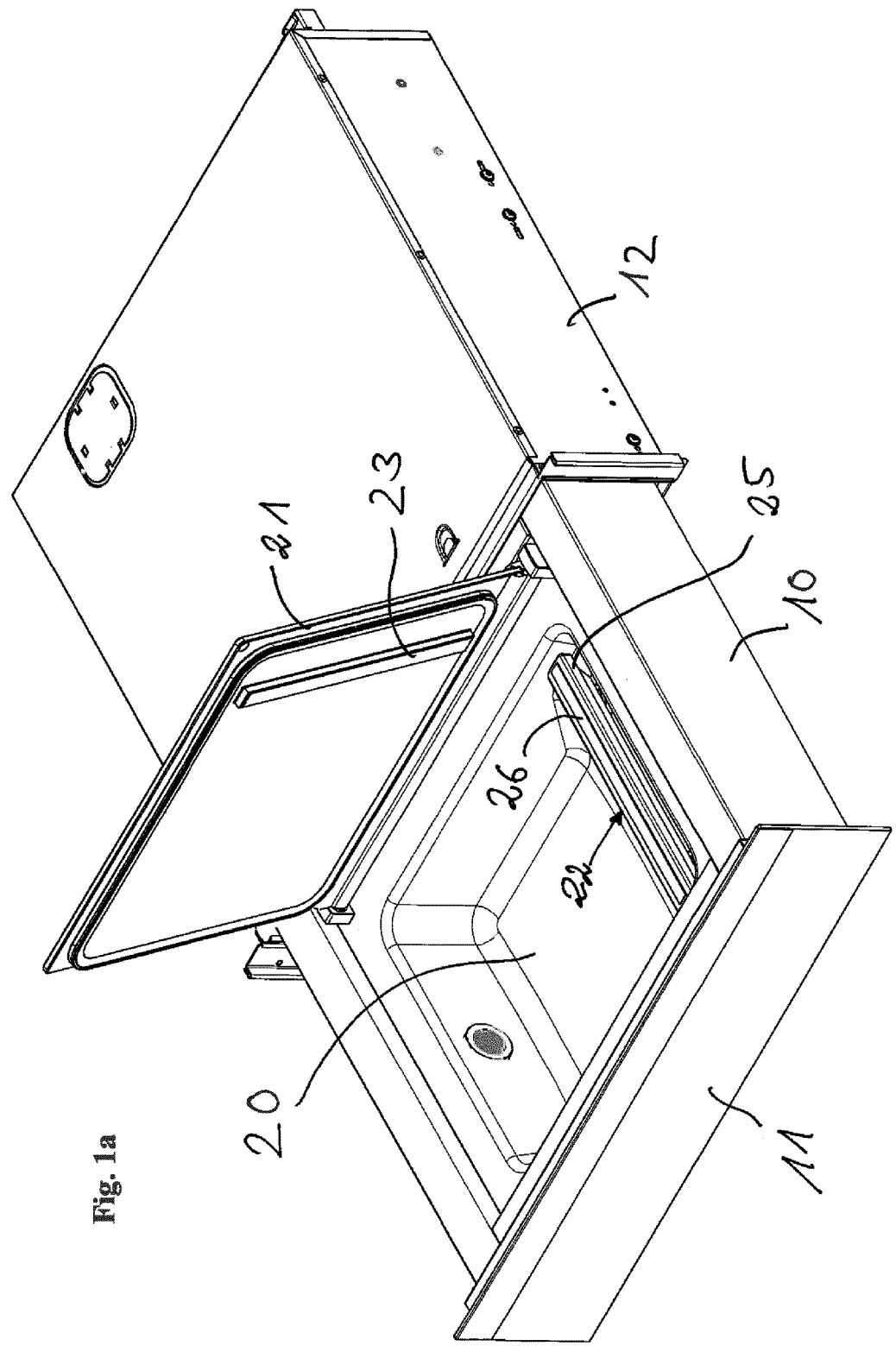
FIGS. 1a, 1b: two isometric representations of the vacuum drawer in accordance with the invention.
Figure 1B:
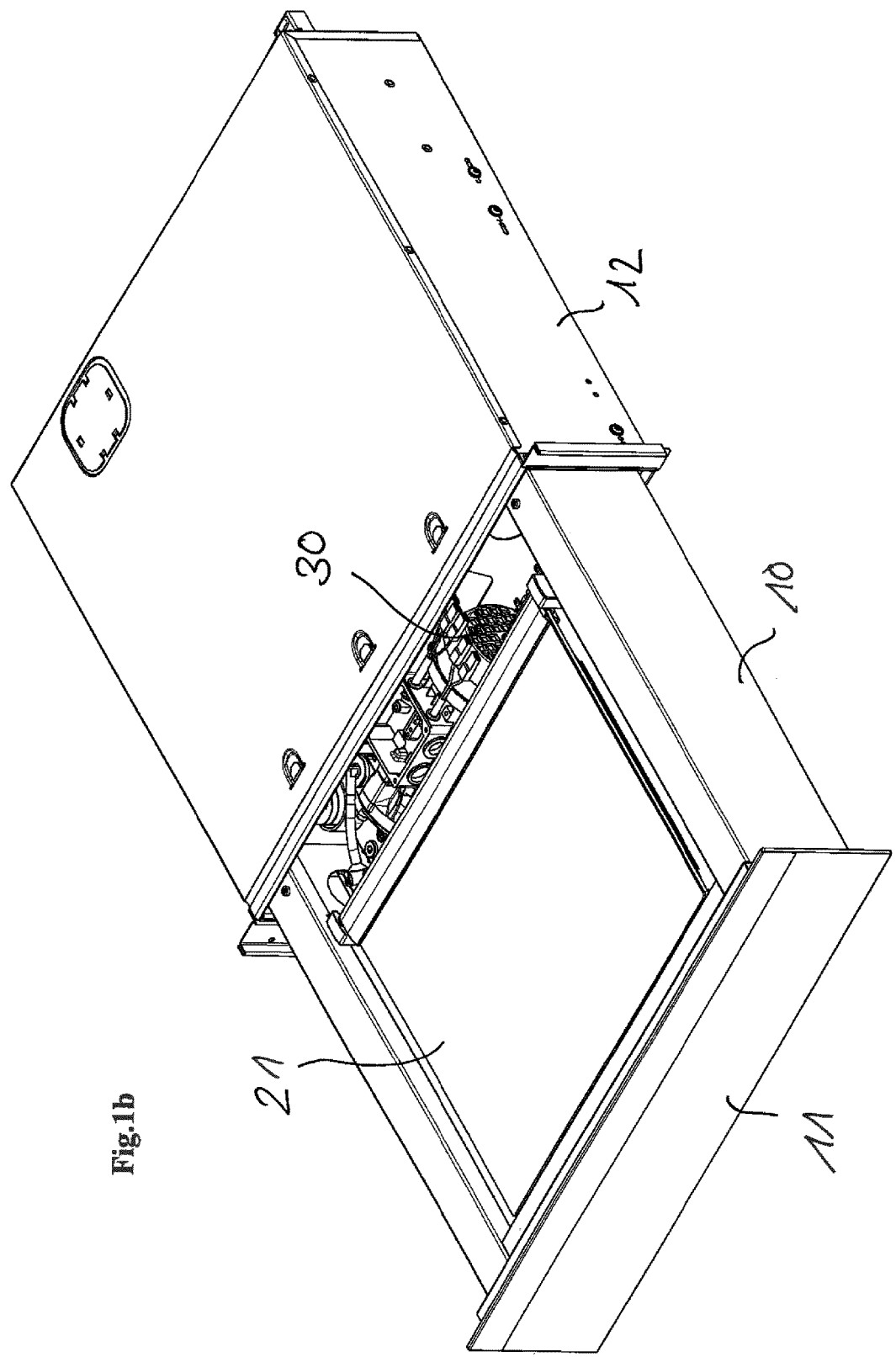

The two FIGS. 1a, 1b show isometric representations of the vacuum drawer in accordance with the invention. The representation of FIG. 1a shows the pulled out drawer for regular vacuuming operation. The drawer has been pulled out a little further again for maintenance purposes in FIG. 1b to allow a view of the vacuum pump 30. The drawer is suitable for use in a piece of kitchen furniture since it is characterized by an installation height of approximately 140 mm and accordingly corresponds to the standard dimension of fitted kitchens.

The vacuum drawer comprises a drawer extension 10 which is longitudinally displaceably guided over lateral guide rails in a drawer carcass 12. In the embodiment shown, the front cover 11 is handle-less and the drawer extension is designed as a push-pull device for opening and closing. A vacuum chamber 20 is supported within the drawer extension and is coupled fluidically to a vacuum pump 30 of the vacuum drawer to pump the air out of the closed vacuum chamber 20. The vacuum chamber 20 can be closed in an airtight manner via the cover 21 pivotably mounted to the chamber 20. The cover 21 itself can be produced from glass for design reasons.

A sealing bar 22, which extends in the chamber interior in the extension direction of the drawer, serves for the sealing of an inserted bag. A bag filled with food is placed into the chamber 20 for vacuuming and the cover 21 is closed in an airtight manner. The bag can be sealed by means of the sealing bar 22 after the evacuation of the chamber 20 by means of the vacuum pump 30 visible in FIG. 1b. The bag opening to be sealed is then placed onto the sealing bar 22 which presses the bag against a contact point after the vacuuming and seals it by the effect of heat. The bar 22 can be pressed either to a counter-pressing bar 23 fastened to the cover 21 or against an alternative pressing surface. The vacuum pump 30 is seated behind the chamber 20 at the rear part of the drawer extension 10 and is coupled fluidically to the vacuum chamber 20 to pump the air out of the chamber 20 to generate the vacuum.

Figure 2:
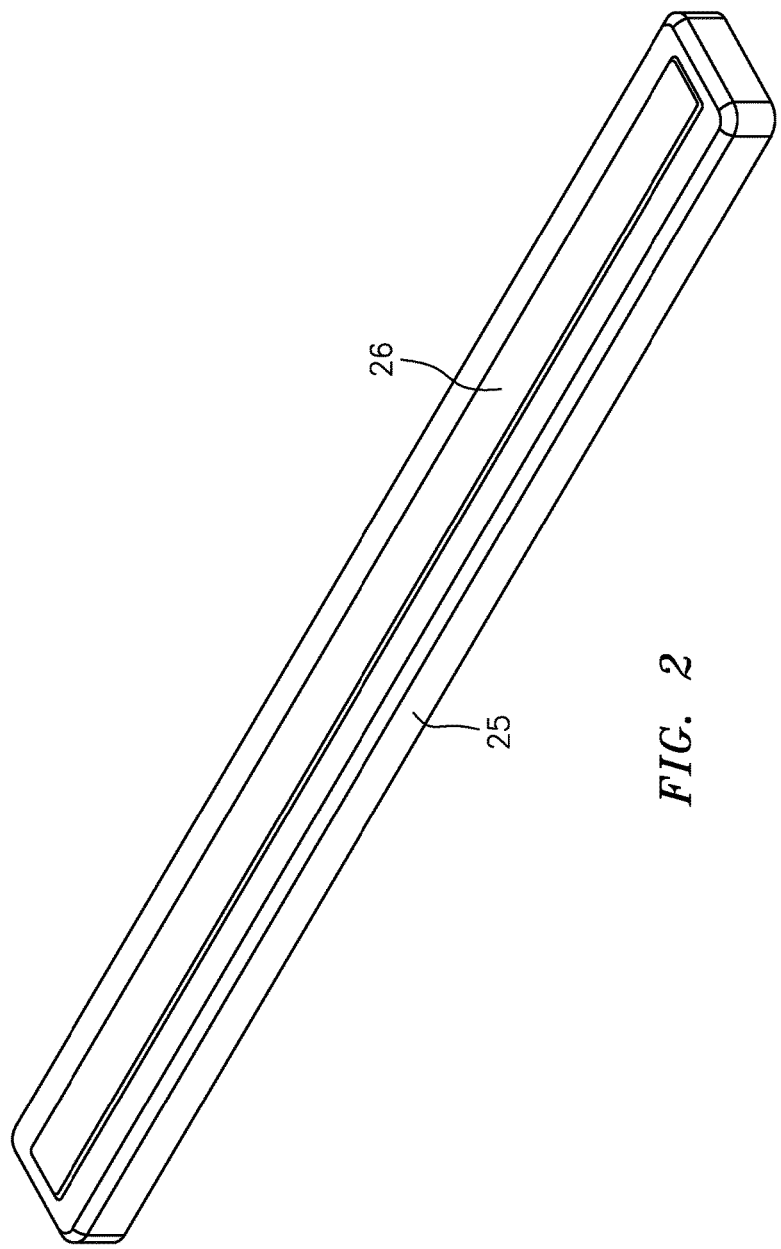
FIG. 2: a perspective view of the frame part of the sealing bar in accordance with the invention.

The sealing bar 22 comprises a base body 40 as well as a frame part 25 which is equipped with a Teflon tape 26. On the sealing procedure, the sealing bar 22 contacts the inserted bag via the Teflon tape 26 and the heat produced by the welding wire 42 is output to the bag via the Teflon tape 26. FIG. 2 shows a perspective representation of the frame part 25 for the sealing bar 22 in accordance with the invention. The frame part 25 comprises the Teflon tape 26 which also extends almost completely over the surface of the sealing bar 22 in its longitudinal direction.

The two-part design of the sealing bar 22 comprising the base body 40 and the frame part 25 allows a fast, simple and inexpensive replacement of the Teflon tape 26. Either the total frame part 25 or only the Teflon tape 26 can be replaced.

Figure 3:
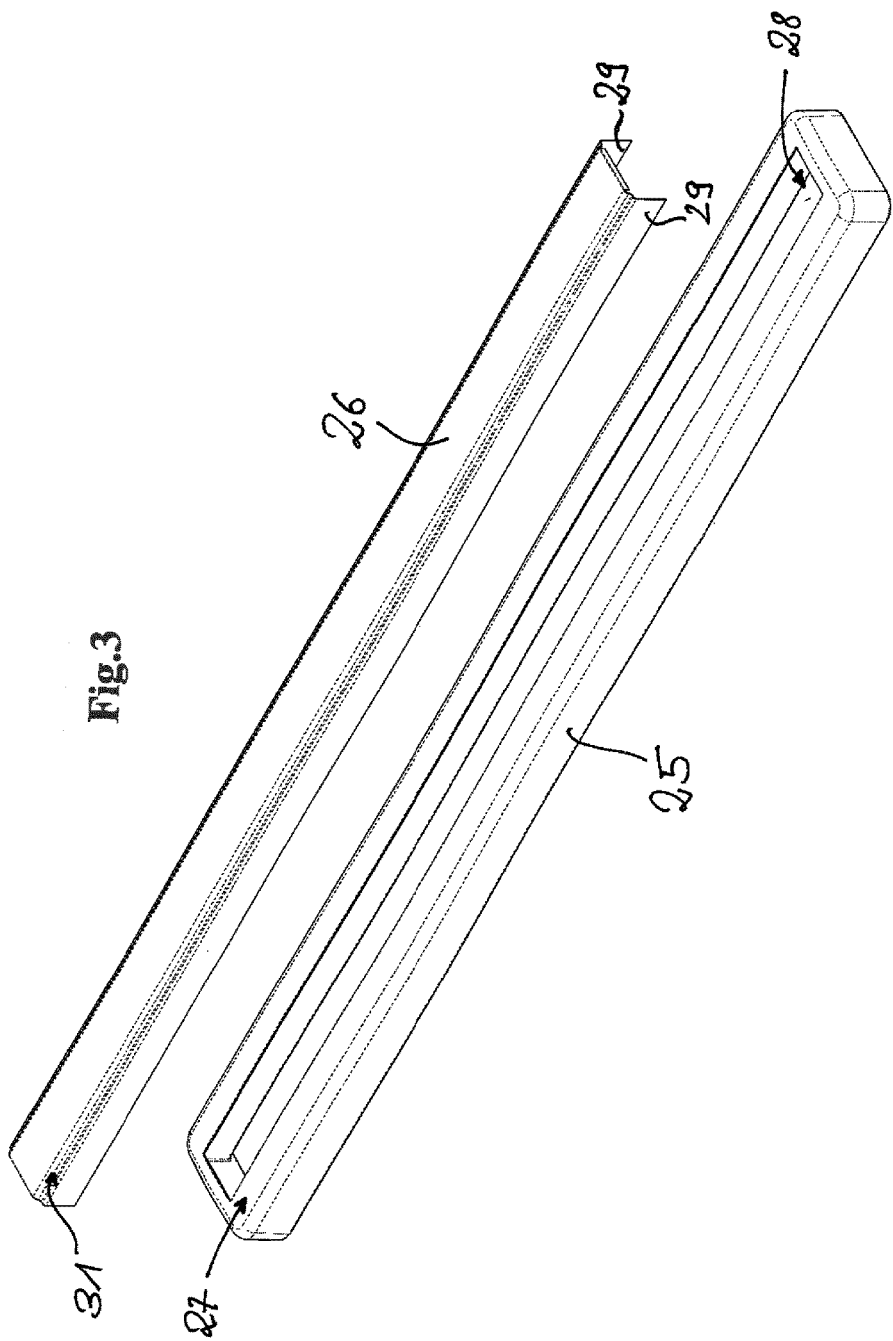
FIG. 3: the frame part of FIG. 2 in an exploded representation.

The exploded representation of FIG. 3 shows the complete Teflon tape 26 as well as the nature of the surface of the frame part 25. The frame part 25 comprises a cut-out 28 on its surface 27 onto which a bag to be correspondingly sealed is placed during the sealing process. The longitudinal edges 29 of the Teflon tape 26 are folded downwardly and the resulting width of the Teflon tape 26 thus approximately corresponds to the opening width of the cut-out 28. The Teflon tape 26 can thereby be inserted into the opening 28 and an almost stepless surface 27 of the frame 25 is produced with an extremely small offset at the transition between the frame part 25 and the Teflon tape 26.

The folding edge 31 of the Teflon tape 26 is, however, not a simple edge, but the fold rather forms a curved, step-like section 31. The exact extent of the section can be seen from the cross-sectional representation of FIG. 4. Due to the selected section shape 31, the Teflon tape 26 can lie tightly at the two sealing lips 32 of the frame part 25 which each extend along the longitudinal edges of the opening 28. The sealing lips 32 reduce the offset in the transition between the frame part 25 and the Teflon tape 26 such that the risk of contamination at the transition is minimized.

Figure 4:
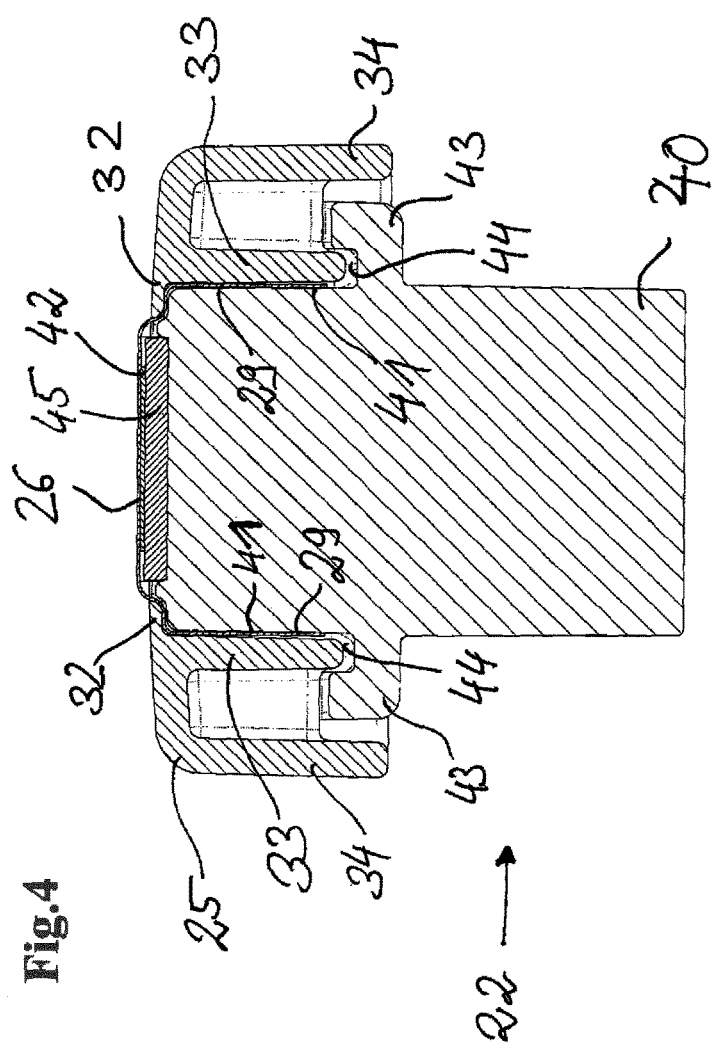
FIG. 4: a sectional representation of the sealing bar in accordance with the invention transversely to its longitudinal axis.

It can furthermore be seen from FIG. 4 that the frame part 25 is placed on the base support 40 of the sealing bar 22 from above. An inner wall 33 projects inwardly or downwardly into the sealing bar 22 in the region of the opening edges of the opening 28 of the frame part 25, whereby an opening wall is formed. This inner wall 33 extends in parallel with the oppositely disposed side wall 41 of the base support 40. The inner wall 33 moreover extends in parallel with the respective outer wall 34 of the frame part 25. There is a gap between the inner wall 33 and the outer wall 34.

The welding wire 42 extends in the longitudinal direction on the surface 45 of the base support 40. If the frame part 25 is placed onto the base support 40 from above, the welding wire 42 is disposed directly below the Teflon tape 26, whereby an ideal heat transfer is produced. The Teflon tape 26 can be fixed to the sealing bar 22 by a clamp connection. For this purpose, the folded longitudinal edges 29 are clamped between the side wall 41 of the base support 40 and the inner wall 33 of the frame part 25. A sealing clamping likewise takes place with the surface of the base support 40 in the region of the sealing lips 32. The Teflon tape 26 can moreover additionally be adhesively bonded to the frame part 25 or can be fastened thereto in a different manner.

On the placing of the frame part 25 onto the base support 40, the lower edge of the inner wall 33 is clipped at the end side into the groove 44 of the base support 40 formed by the projection 43.

Figure 5A:
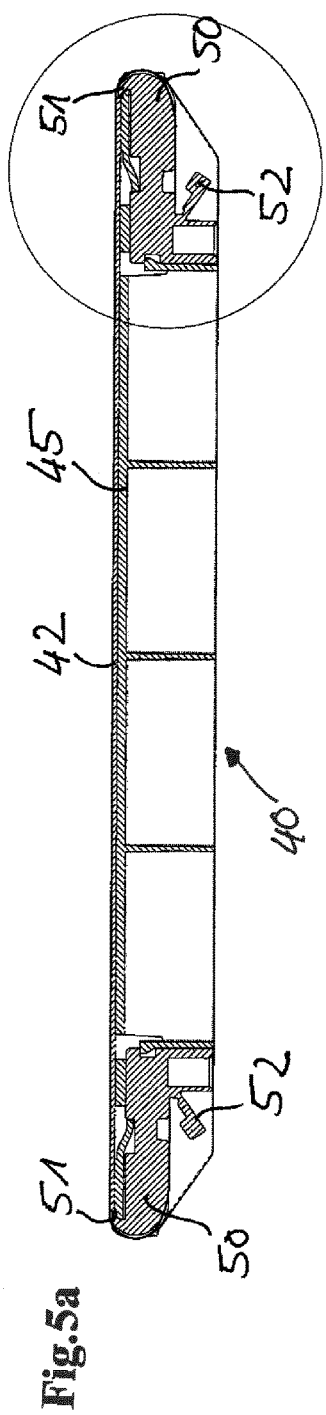
FIG. 5a: a sectional representation of the base support along the longitudinal axis.
Figure 5B:
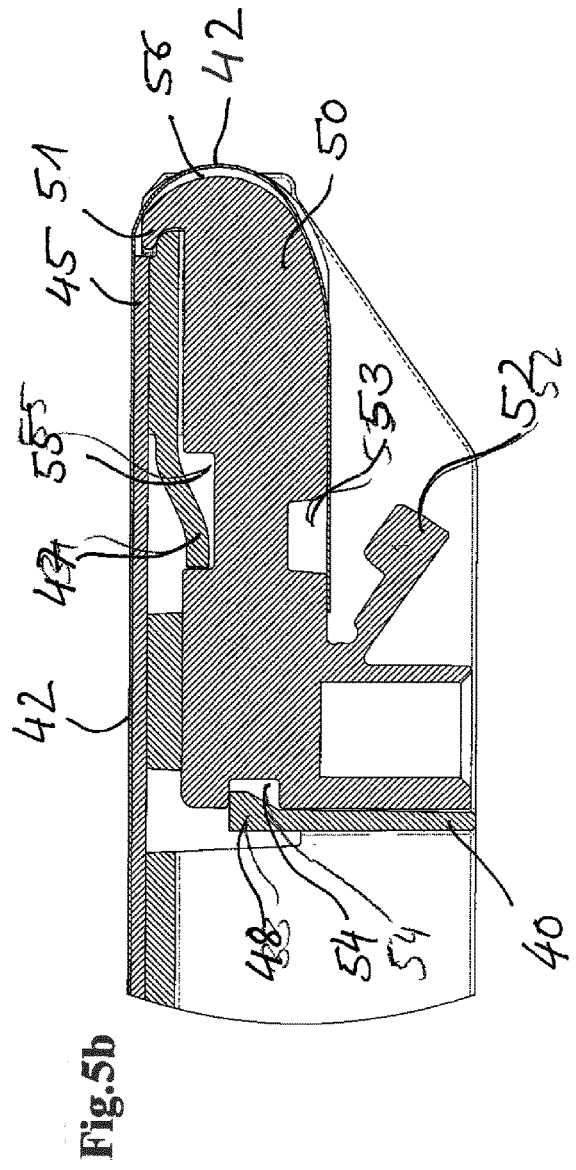
Figure 6:
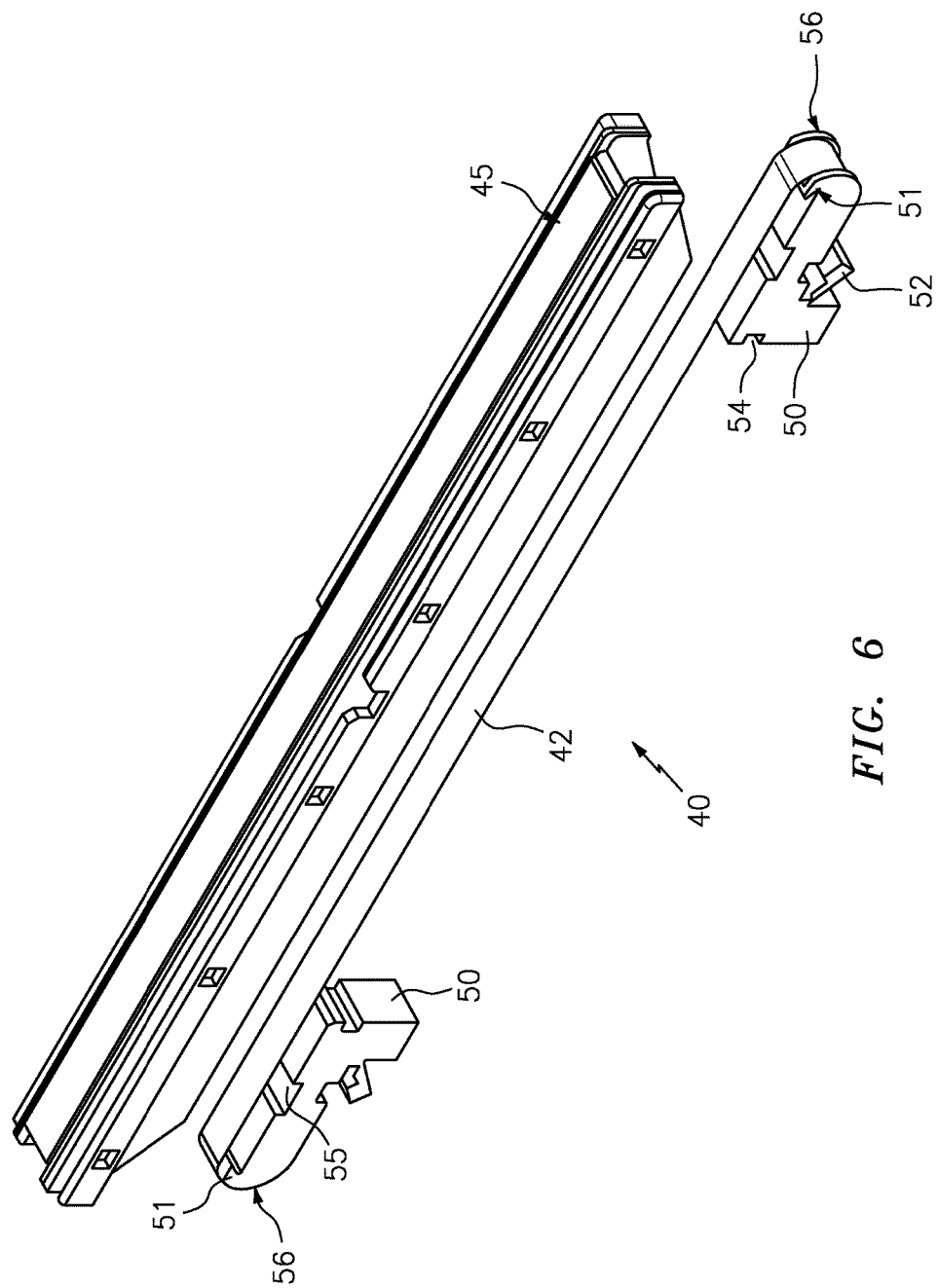
FIG. 6: an exploded representation of the base support of the sealing bar.

The fastening of the welding wire 42 to the base support 40 will be explained in more detail in the following with reference to FIGS. 5a, 5b and 6. FIG. 6 shows an exploded representation of the base support 40, while FIG. 5a shows a longitudinal section through the base support 40. FIG. 5b represents a detailed section of the right hand side of the base support 40 of FIG. 5a.

The welding wire 40 is clamped in the longitudinal direction over the total surface 45 of the base support 40, with the free welding wire ends being guided over the end edges of the base support 40 at its lower side. The fixing of the welding wire 42 to the base support 40 is achieved using clamping means 50. They are produced from an electrically conductive material and simultaneously represent the connection points of the sealing bar 22 for the electric supply.

A hook 51, which is formed by the rounded end edge 56 of the clamping means 50, is located at the upper side of the clamping means 50. A groove 53 as well as a plug 52 which is flexibly fastened to the clamping means and which can be pressed into the groove 53 with an exact fit is located at the lower side of the clamping means 50. A cut-out 55 is located at the upper side of the clamping means 50 and a further cut-out 54 is present at the rear side of the clamping means 50. The free ends of the welding wire 42 are placed downwardly from the upper side over the groove 53 via a respective rounded end side 56 of the clamping means 50 and are clampingly fixed to the clamping means 50 by pressing the plug 52 into the groove 53.

The two clamping means can subsequently be hung at the base support 40 at the end side via the hooks 51. The hooks are preferably hung in at the base support from above and are subsequently pressed below the lower side of the base support by an inward rotational movement. A sufficient tension of the welding wire is thus achieved by the lever effect associated therewith so that said welding wire extends uniformly and in a planar manner over the upper side 45 of the base support 40. The preload is selected such that a uniform contact also takes place with a heat-induced lengthening of the welding wire 42. In this position, the clamping means 50 are additionally latched via the cut-outs 54, 55 to the corresponding latching hooks 47, 48 of the base support 40. It must also be mentioned that the clamping means 50 are located in a protected manner in the fixed position in a hollow space of the clamping bodies 50.

The invention claimed is:

1. A sealing bar (22) for a vacuum drawer for the vacuuming of food, having a base support (40) comprising at least one welding wire (42), a frame (25), and a non-stick tape (26), wherein
    the frame (25) is releasably fastenable to the base support (40),
    the frame (25) has an opening (28) on a side facing a bag to be sealed which is continuous in a longitudinal direction and covered by the non-stick tape (26),
    the longitudinal edges (29) of the non-stick tape (26) are bent or folded to project into the opening (28) of the frame (25),
    at least one edge around the opening (28) comprises a sealing lip (32) for preventing or reducing dirt from collecting between the non-stick tape (26) and the opening (28) edge, said sealing lip (32) extending above and over a surface (45) of the base support (40), and
    the bent or folded longitudinal edges (29) the non-stick tape (26) extending between the sealing lip (32) and base support (40), said frame (25) comprises inner (33) and outer (34) walls, with adjacent inner (33) and outer (34) walls separated from one another by a gap, and the surface (45) of the base support (40) comprises a pair of projections (43) each defining a groove (44) with an adjacent side wall (41) of the base support (40) for receiving a respective inner wall (33) of the frame (25) between the respective projection (43) and side wall (41).

2. A sealing bar in accordance with claim 1, wherein the non-stick is a Teflon tape.

3. A sealing bar in accordance with claim 1, wherein the welding wire of the base support extends directly below the non-stick tape with the frame installed.

4. A sealing bar in accordance with claim 1, wherein the non-stick tape is fixed at the frame and/or at the base support.

5. A sealing bar in accordance with claim 4, wherein the non-stick tape (26) is adhesively bonded at points to the frame and/or at the base support.

6. A sealing bar in accordance with claim 1, wherein the non-stick tape is fixed to the sealing bar by a clamping connection between the frame and the base support.

7. A sealing bar in accordance with claim 1, wherein the frame releasably fastenable to the base support by latching.

8. A vacuum drawer, suitable for installation into a piece of furniture, having a vacuum chamber and at least one sealing bar in accordance with claim 1 supported in the vacuum chamber.

9. A sealing bar in accordance with claim 1, additionally comprising
    a clamping connection (50) at least at one end side of the base support (40) for fastening the welding wire (42) to the base support (40),
    the welding wire (42) being received by said clamping connection (50) at the end side of the base support (50), with the clamping connection (50) being releasably connectable to the base support (40), and
    the clamping connection (50) comprising a hook (51) hung from the base support (40) at a location underneath the welding wire (42), with the clamping connection (50) additionally being fixed to a lower side of the base support (40) below the surface (45) of the base support (40) and the hook (51) being hung at a transverse edge of the surface (45) of the base support (40).

10. A sealing bar (22) in accordance with claim 9, wherein the clamping connection (50) additionally comprises cutouts (54, 55) for the respective latching hooks (47, 48),
    with one cutout (55) on an upper surface of the clamping connection (50) and the other cutout (54) on a normally-extending surface to the upper surface of the clamping connection (50).

11. A sealing bar (22) in accordance with claim 10, wherein the clamping connection (50) additionally comprises a groove (53) on a lower surface thereof into which the welding wire (42) is pressable by a pivotally-mounted plug (52) of the clamping connection (50).

* * * * *